(12) United States Patent
Vogl et al.

(10) Patent No.: US 7,262,713 B1
(45) Date of Patent: Aug. 28, 2007

(54) SYSTEM AND METHOD FOR A SAFE DEPICTION OF TERRAIN, AIRPORT AND OTHER DIMENSIONAL DATA ON A PERSPECTIVE FLIGHT DISPLAY WITH LIMITED BANDWIDTH OF DATA PRESENTATION

(75) Inventors: Thomas L. Vogl, Cedar Rapids, IA (US); Eric N. Anderson, Cedar Rapids, IA (US); Alexel Postnikov, North Liberty, IA (US); Koji Katakura, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 219 days.

(21) Appl. No.: 10/954,535

(22) Filed: Sep. 30, 2004

(51) Int. Cl.
*G08B 23/00* (2006.01)

(52) U.S. Cl. .......... 340/970; 340/961; 342/65; 345/419; 701/9; 701/14; 707/104

(58) Field of Classification Search ........ 340/970, 340/961, 945, 963, 971, 973; 701/9, 14, 701/3; 342/65; 345/419, 426; 707/104; 395/129; 382/294
See application file for complete search history.

(56) References Cited

U.S. PATENT DOCUMENTS

| | | | | |
|---|---|---|---|---|
| 5,257,347 A * | 10/1993 | Busbridge et al. | ......... | 345/649 |
| 6,208,997 B1 * | 3/2001 | Sigeti et al. | ......... | 707/104.1 |
| 6,317,690 B1 * | 11/2001 | Gia | ......... | 701/301 |
| 6,400,831 B2 * | 6/2002 | Lee et al. | ......... | 382/103 |
| 6,600,489 B2 | 7/2003 | Cook | ......... | 345/426 |
| 6,678,588 B2 * | 1/2004 | He | ......... | 701/3 |
| 6,710,723 B2 | 3/2004 | Muller et al. | ......... | 340/970 |
| 6,782,312 B2 * | 8/2004 | He | ......... | 701/3 |
| 6,862,501 B2 * | 3/2005 | He | ......... | 701/3 |
| 2001/0013866 A1 * | 8/2001 | Migdal et al. | ......... | 345/423 |
| 2003/0021491 A1 * | 1/2003 | Brust | ......... | 382/294 |
| 2003/0195672 A1 * | 10/2003 | He | ......... | 701/3 |
| 2004/0083038 A1 * | 4/2004 | He | ......... | 701/3 |

OTHER PUBLICATIONS

Multiresolution Visualization and Compression of Global Topographic Data; Thomas Gerstner, Department for Applied Mathematics, University of Bonn, Germany.

* cited by examiner

*Primary Examiner*—Brent A. Swarthout
(74) *Attorney, Agent, or Firm*—Nathan O. Jensen; Kyle Eppele

(57) ABSTRACT

The present invention is directed to a system and method for a safe flight display through increasing situation awareness by an optimal presentation, given limited capacity of the system. The system may determine which terrain area needs a detail representation and which area needs a coarse representation. A view-dependent visual error metric may be utilized to define and maintain an error bound and accurately minimize the amount of terrain data being depicted. By performing a breadth-first search on the terrain database, a user can determine amount of geometry to be displayed with limited bandwidth of data presentation. The user may be allowed to scale the application to his/her desired level of detail, given a capacity of the system. Therefore, the system may provide a safe flight display with an anticipated and graceful (all portions of the screen would be given an equal quality representation) degradation in performance upon the choice of the user.

20 Claims, 6 Drawing Sheets

SYSTEM AND METHOD FOR A SAFE DEPICTION OF TERRAIN, AIRPORT AND OTHER DIMENSIONAL DATA ON A PERSPECTIVE FLIGHT DISPLAY WITH LIMITED BANDWIDTH OF DATA PRESENTATION

FIELD OF THE INVENTION

The present invention generally relates to the field of depiction of dimensional data and particularly to a real time depiction of terrain and other dimensional data on a perspective flight display.

BACKGROUND OF THE INVENTION

With the rapid development of technology in scene visualization and computer graphics, there are various ways to display digital terrain images in real time referenced relative to the travel of an aircraft over a terrain. Flight displays require depiction of large terrain areas. Further, each scene (of a terrain) may contain millions of polygons in order to provide a safe flight display with high fidelity digital terrain depictions. Consequently, depiction of such a scene in real time with a large amount of terrain data often exceeds capacities of currently available systems.

Various methods for reducing resolution have been utilized in order to reduce the amount of terrain data for a particular depiction of data within the larger database. One of the most commonly used methods to reduce resolution may be a level of detail (LOD) method or variation of the LOD method. Generally, the main focus of the LOD method has been a reduction of the total number of polygons displayed on the screen at any point in time. Sub-sampled data is displayed, depending only on a distance from a viewpoint. The LOD method has been favored since it is simple and predictable. It also increases frame rates while maintaining local precision due to polygon reduction. (The frame rate is the number of frames or images that are projected or displayed per second. The higher the number of frames playing per second, the smoother the video playback appears to the user.)

Referring now to FIGS. 1-2, exemplary images of a terrain area are shown wherein a LOD method is used for selecting a level of the terrain grid. In FIG. 1, the top view of the exemplary terrain image is shown. In FIG. 2, the perspective view of the exemplary terrain image is shown. The LOD approaches tend to lose distinguishable features in the distance since the reduction in detail is not directly correlated to what is resolvable by a viewer (e.g. a pilot). As such, the LOD method may not achieve the optimal polygon reduction since the level of detail does not take actual elevation data into account. Moreover, it is impossible to generate error bounds (an error bound is an approximate error of each polygon representation) correctly since some data is discarded based on a viewpoint only.

Another example of the method to reduce resolution of terrain data may be a visibility preprocessing method such as Delauney algorithm. The visibility preprocessing method may increase the performance of the display system when it is used with the LOD method. However the method requires preprocessing of terrain data for runtime optimizations. Furthermore, its approach is usually based on a geometric error, which does not take the position of a viewer into account. The visibility preprocessing method may not differentiate a significant terrain area from a non-significant terrain area. For example, a mountain close to an aircraft may be regarded as a significant terrain area, requiring a detailed geometry for a safe terrain depiction.

Therefore, it would be desirable to provide a system and methods that overcome the drawbacks of existing terrain rendering methods and provide a safe visual representation of terrain data in real time, given limited capacity of the display system. It would be also desirable to provide a system and method allowing a user to determine the scale of the application based on hardware platforms, or to deterministically provide frame rates while maximizing precision. Deterministic frame rate is useful to maintain a consistent scene flow-rate.

SUMMARY OF THE INVENTION

Accordingly, the present invention provides a method and system for safe depiction of global space data including terrain, airport, and other dimensional data on a perspective flight display with limited bandwidth of data presentation. Further, the method and system of the present invention allows a user to attain an amount of geometry information to be displayed based on a visual error threshold selected by the user. Therefore, the user may determine the scale of the application depending on capacities of hardware platforms.

A flight display system for a safe depiction of global space data may comprise a sensor system, a terrain application system, and a display system. The sensor system may determine a position and orientation of an aircraft and provide the position information to the terrain application system. The terrain application system may generate several real time terrain images having reduced resolutions suitable to be displayed in real time. The display system may display the generated real time terrain images. Further, the flight display system may comprise a terrain database server providing terrain data to said terrain application system upon request of the terrain application system. The terrain database server may comprise a terrain database and a processor. The terrain database stores the global space data represented by a regular grid terrain mesh.

The terrain application system may utilize various viewer-dependent Level of Detail rendering (LOD) methods. The terrain application system may dynamically generate terrain meshes for each frame based on error bounds. Accordingly, the terrain application system may provide the optimal detail and triangle ratio due to reduced use of triangles within a given error threshold. By utilizing the terrain application system to do a breadth-first search on the terrain database, the user can attain a deterministic amount of geometry and therefore may determine a desirable scale of geometric detail tune to a given hardware platform. For example, given a system that operates at 1,000 triangles per scene, the system can fill that budget while optimizing/minimizing the visual error over the scene. The user may have a choice of level of detail terrain rendering by changing the level of error threshold. The error metric, in addition to being distance-based, can also be center-of-screen or a given position-based.

The present invention may provide more detailed terrain rendering for areas where the user desired detailed views. In another advantageous aspect of the present invention, the user may have a prior knowledge of the degradation in performance for a low powered platform. It also allows trade off between frame rates and visual error. Further, the terrain application system may be suitable to utilize various existing distance dependent LOD methods.

It is to be understood that both the foregoing general description and the following detailed description are exemplary and explanatory only and are not restrictive of the invention as claimed. The accompanying drawings, which are incorporated in and constitute a part of the specification, illustrate an embodiment of the invention and together with the general description, serve to explain the principles of the invention.

BRIEF DESCRIPTION OF THE DRAWINGS

The numerous advantages of the present invention may be better understood by those skilled in the art by reference to the accompanying figures in which.

DETAILED DESCRIPTION OF THE INVENTION

Reference will now be made in detail to the presently preferred embodiments of the invention, examples of which are illustrated in the accompanying drawings.

Referring generally now to FIGS. 3 through 9B, exemplary embodiments of the present invention are shown.

The present invention is directed to a system and method for a safe flight display through increasing situation awareness by an optimal presentation, given limited capacity of the system. The system may determine which terrain area needs a detail representation and which area needs a coarse representation. A view-dependent visual error metric may be utilized to define and maintain an error bound and accurately minimize the amount of terrain data being depicted. The base unit for visual error is the unit of visual depiction and on theses displays a pixel. This can be translated into world units of meters. The system guarantees optimal use of triangles (terrain grids) within a given error bound and thus the system provides the optimal detail and triangle ratio. It should be appreciated that the splitting is a comparison of an estimate (coarse point) with successively more detailed (fine) points an existing database.

The system may allow trade off between frame rates and visual error. Further, the system may allow trade off between detail and frame rates. Accordingly, a particular accuracy can be maintained though the frame rate is not deterministic. By performing a breadth-first search on the database, the user can attain an amount of geometry information to be displayed based on a visual error threshold selected by the user. Therefore, the user may determine the scale of the application based on hardware platforms by choosing a desired error bound. Accordingly, the present invention may show detailed terrain rendering for high-powered platform (having high capacity of visual data processing) and less detailed terrain rendering for low-powered platform (having low capacity of visual data processing).

Figure 1:
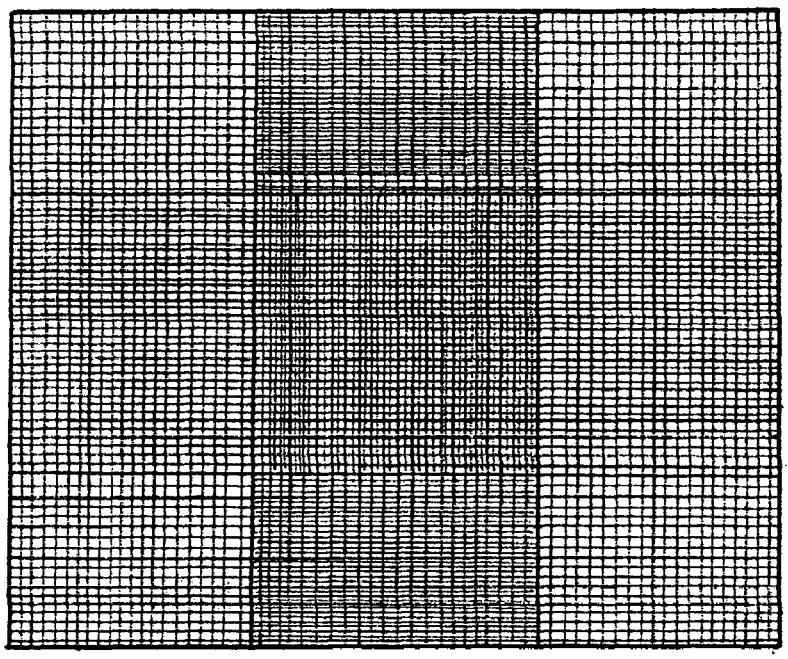
FIG. 1 is an illustration of a top view of a terrain area wherein a LOD method is used.
Figure 2:
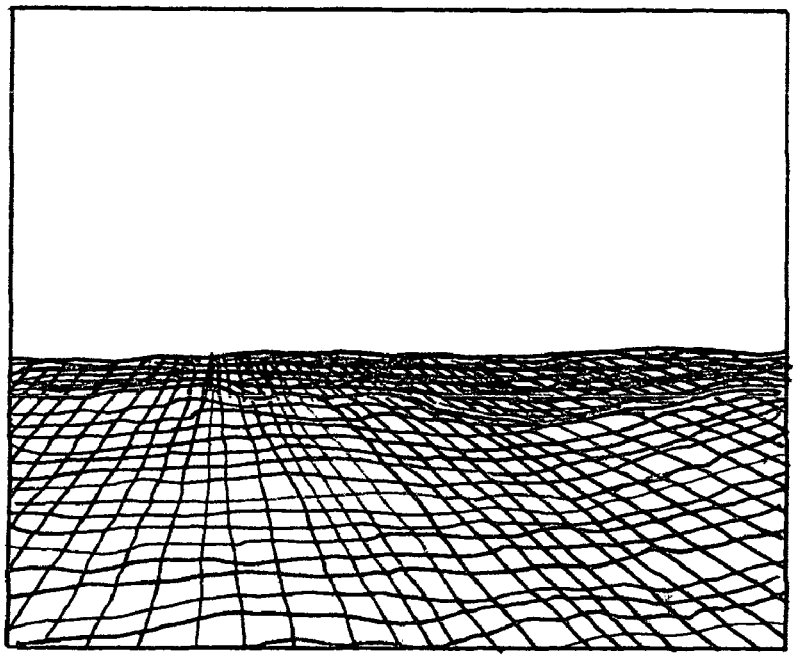
FIG. 2 is an illustration of a perspective view of the terrain area of FIG. 1 wherein a LOD method is used.
Figure 3:
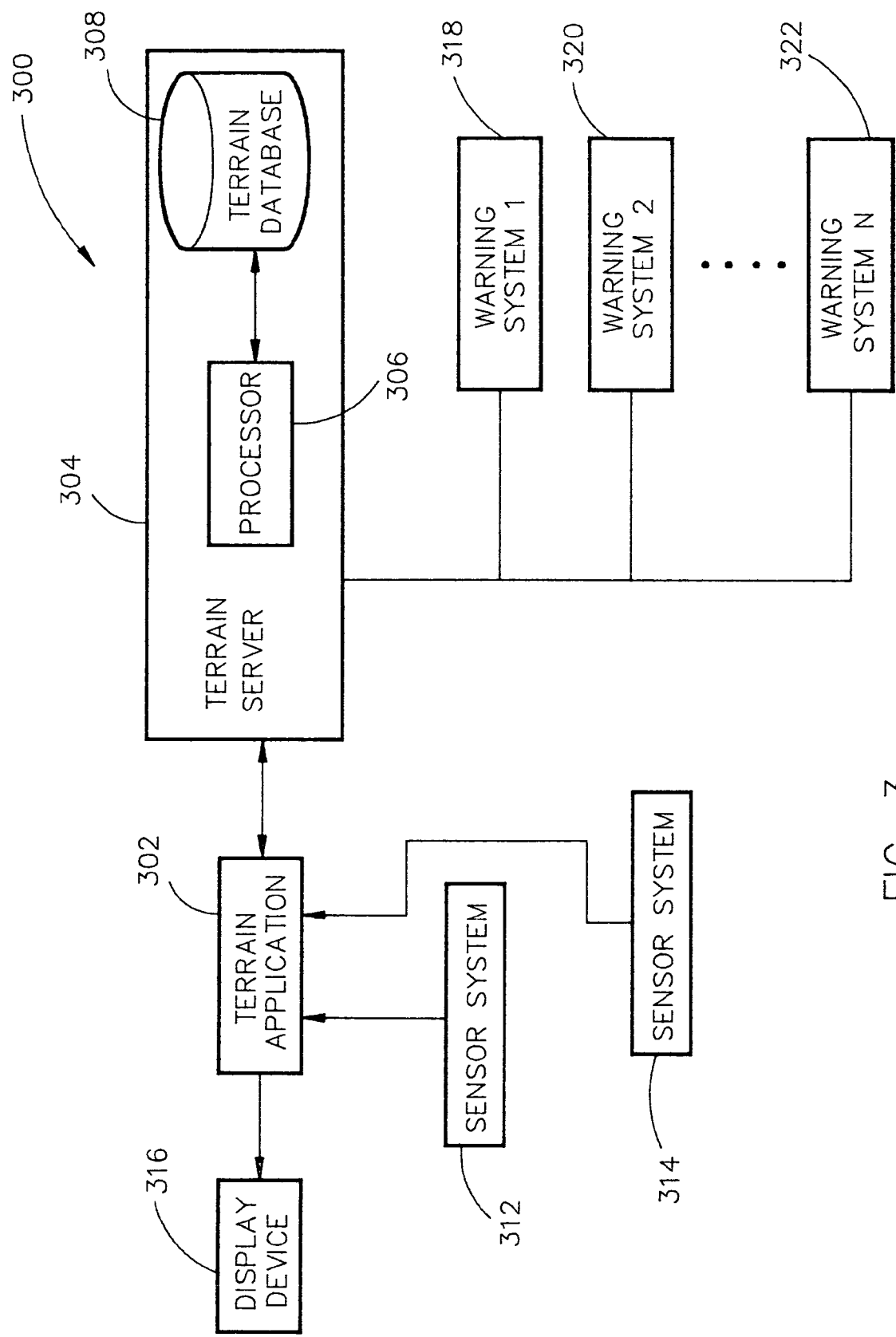
FIG. 3 is a block diagram illustrating a computer system capable of implementing a method and system in accordance with the present invention.

In exemplary embodiments, the present invention may be implemented as sets of instructions or software readable by system devices such as a computer system 300 illustrated in FIG. 3. Further, it is understood that the specific order or hierarchy of steps in the methods disclosed are examples of exemplary approaches. Based upon design preferences, it is understood that the specific order or hierarchy of steps in the method can be rearranged while remaining within the scope and spirit of the present invention. The accompanying method claims present elements of the various steps in a sample order, and are not necessarily meant to be limited to the specific order or hierarchy presented.

Referring now to FIG. 3, an exemplary system 300 capable to implement a safe depiction of terrain data on a perspective flight display is described. The exemplary system 300 may be suitable to be equipped as a part of an avionic system. The exemplary system 300 may include a terrain database server 304 comprising a processor 306 and a terrain database 308. A terrain application system 302 may request the terrain database server 304 to provide data of a certain section of a terrain area based on the position of an aircraft. Sensor systems 312, 314 may provide aircraft position information to the terrain application system 302 after determining the position of an aircraft in real time. An example of the sensor system may include a Global Positioning System (GPS) based sensor system, an air attitude heading reference system (AHRS) or the like. In a particular embodiment of the present invention, a combination of an air attitude heading reference system 312 and a GPS based sensor system 314 may be utilized as a sensor system. The system 300 also comprises a display device 316 coupled to the terrain application system 302. The display device 316 may be suitable to display a representation of optimized terrain data. The display device 316 may include various CRT monitors, flat display systems or the like. Additionally, the system 300 may comprise various avionic warning systems 318-322 coupled to the terrain data server 304. For example, an audible flight warning system may be incorporated into the system to alert a pilot via an audible and visual warning indicating hazardous terrain objects.

It should be appreciated that there are numerous ways to represent terrain data. One example may be an ordinary mesh representation. It is known as triangulated irregular networks (TINs). Another example may be a regular grid representation (x,y,z) that is equally spaced in the x and z directions. The y value is used as the height information. Generally, in the regular grid representation, the basis for terrain data is represented as a height field of points. In one embodiment of the present invention, the system may use terrain data represented by regular grids of elevation data since most available terrain data is represented as a height field of points. Utilizing the regular grid representation may be desirable since the method of splitting of regular terrain grids is simpler than the method of splitting irregular triangles. Consequently, minimal preprocessing on the terrain data may be required.

Figure 4:
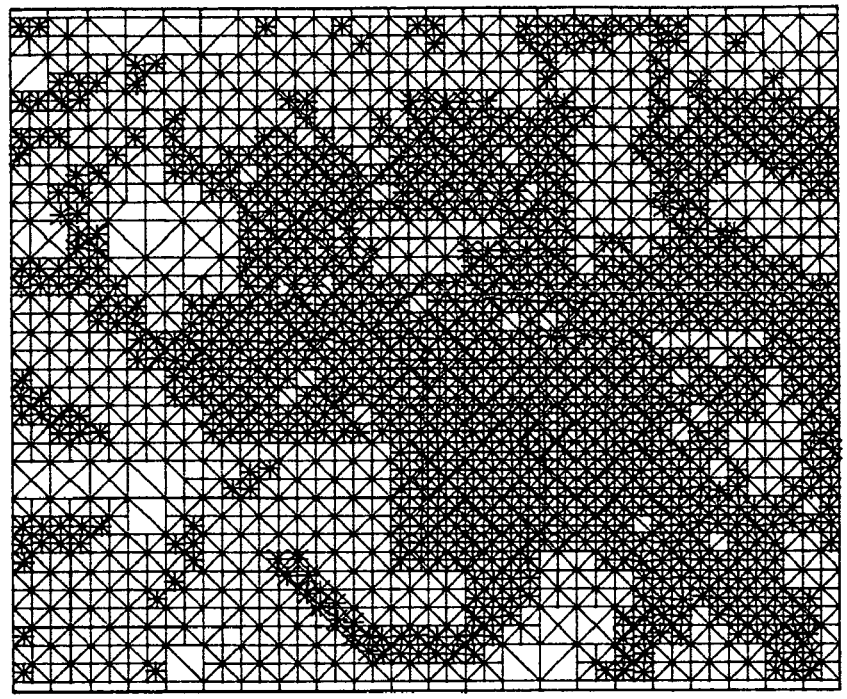
FIG. 4 is an illustration of a top view of the terrain area of FIG. 1 wherein the top view is generated via an exemplary embodiment in accordance with the present invention.

Referring now to FIG. 4, a top view of a terrain mesh (a set of terrain triangles) is shown. Terrain areas that are flat are represented more coarsely than rough terrain areas.

Figure 5:
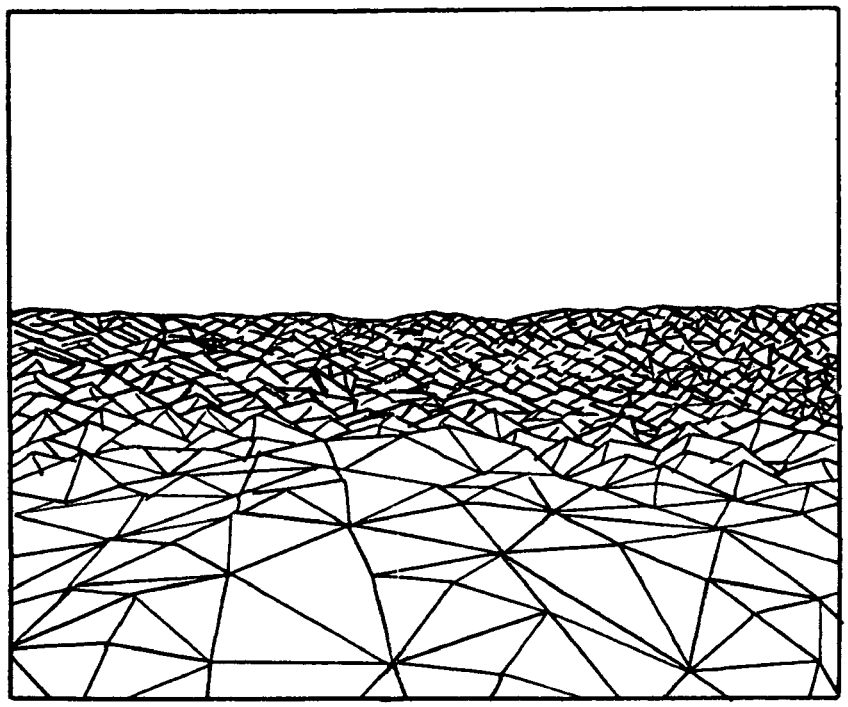
FIG. 5 is an illustration of a perspective view of the terrain area of FIG. 1 wherein the perspective view is generated via an exemplary embodiment in accordance with the present invention.

Likewise, distant terrain areas are represented more coarsely than close terrain areas. Referring now to FIG. 5, an exemplary terrain image with visible terrain grid edges generated by an embodiment of the present invention is shown. Using a visibility based error metric, terrain areas that are flat or distant from the user may be represented more coarsely than those areas which are close or rough terrain areas. In visibility based error metrics, the error is calculated based on a pixel-error or a screen error. For example, if there is a mountain far away (for example, 60 nautical miles away) with an altitude error of 200 feet, the pixel error for the mountain terrain may be less than one pixel error. At this point, the mountain may not need to be depicted in detail if the system has a threshold pixel error of two-pixel error. However, when an aircraft is approaching a mountain, the mountain may be represented in more detail for providing a safe terrain image. At some point, the pixel error of the mountain may become greater than the threshold error. The terrain grid of the mountain is triangulated (split) more to depict a closer look. In a particular embodiment of the present invention, the system may utilize a continuous level of detail (CLOD) method to populate the mountain terrain depiction by recursively taking the terrain grid of the mountain and dividing the terrain grid into smaller grids until each grid has the threshold pixel error. Finally, the terrain image may be displayed after every terrain grid has one pixel error that is less than the threshold error.

Figure 6:
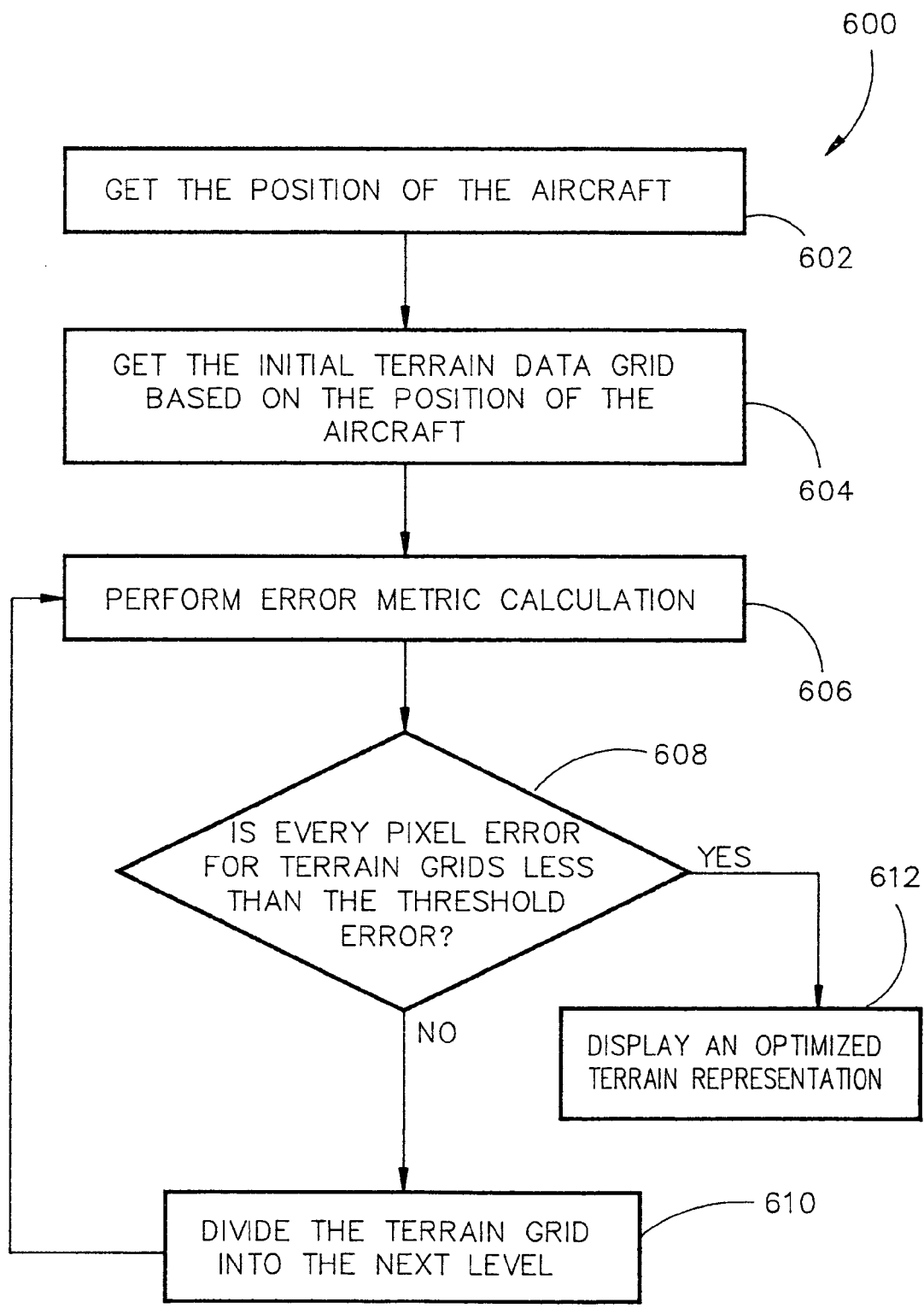
FIG. 6 is a flow diagram describing the steps to implement an exemplary system of the present invention.

Referring now to FIG. 6, a flow diagram describing the steps to display a safe terrain data depiction in accordance with an exemplary embodiment of the present invention is shown. The process 600 may begin with the step in which the system retrieves information of the position and orientation of an aircraft 602. The position and orientation of an aircraft may be determined by sensor systems including a Global Positioning System (GPS) based sensor system, an air attitude heading reference system (AHRS) or the like. In an embodiment of the present invention, a combination of an air attitude heading reference system and a GPS based sensor system may be utilized as sensor systems. The terrain application system may request the terrain database server to provide data of a certain section of terrain based on the position of the aircraft 604. It should be appreciated that an initial terrain grid may cover various sizes of a terrain area, for example, 200×200 nautical miles with a data-point spacing of as little as 30 feet would result in many million triangles. The system performs error metric calculations on the initial terrain grid. The pixel error for the terrain grid may be compared with a predetermined threshold error value 608. If the pixel error is greater than the threshold error, the terrain grid may be dissected to represent more detailed geometry 610. The system may perform error metric calculations on the dissected terrain grids recursively, until each of the dissected terrain grids has a pixel error which is less than the error threshold. If the pixel error for every terrain grid is less than the threshold error value 608, the system displays the terrain representation in real time 612. The process 600 may display detailed terrain images for a system with high bandwidth of data presentation and less detailed terrain images for a system with low bandwidth of data presentation. The present invention may provide more detailed terrain images for areas where a pilot (a viewer) may desire detailed views. Likewise, the system may provide coarse terrain image for areas which cannot be recognized or used by the pilot at a given time. The system may allow trade off between frame rates and visual error. Thus, by utilizing the system and method, the user can attain an amount of geometry information based on an error threshold selected by the user and therefore the user may determine the scale of the application based on the hardware platform capacity of the system. The system guarantees optimal use of triangles (terrain grids) within the given error threshold and thus the system provides the optimal detail and terrain grid ratio. The optimal detail is defined as even distribution of detail relative to error metric.

Figure 7:
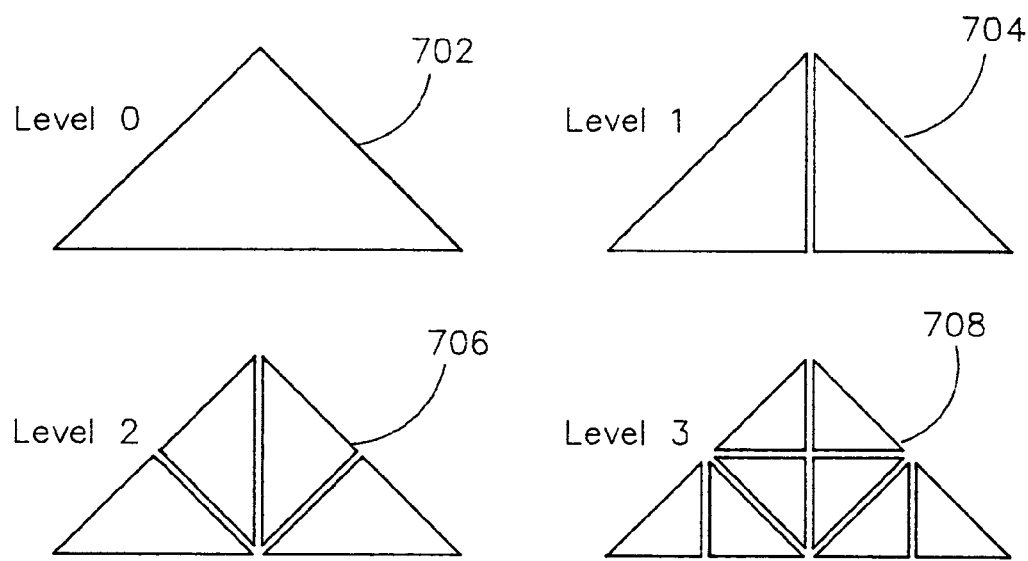
FIG. 7 is a depiction of a triangle binary tree generated by recursive subdivision.

In a particular embodiment of the present invention, the system may utilize a binary tree triangulation method to divide a terrain grid known as a Real time Optimally Adapting Meshes (ROAM) method. The system may work with a triangle-based mesh for the terrain rendering. Individual triangles include simple isosceles right triangles obtained by recursive subdivisions of an initial triangle representing a large terrain object. Dividing the initial triangle produces two smaller triangles. Recursively dividing the triangles so obtained produce a collection of triangles, forming a binary tree. In FIG. 7, exemplary triangular subdivisions are shown. A large triangle 702 is a root triangle (level-0) which is the initial representation of a terrain area. The area is usually a sub-section of the entire database, but at least as large as the viewing volume. Since it is a top view of the area, the height differences at the various points that are used to represent the large (level-0) triangular terrain object may not be distinguishable. For example, the root triangle 702 may be a representation of a flat triangle area, defined by three points, displayed at some angle to the viewer. The triangles 704 are level-1 triangles produced by dividing the root triangle. The triangles 704 may represent the terrain object with more geometry information than the root triangle 702. The triangles 708 are level-3 triangles produced by dividing the root triangle recursively. The triangles 708 cover the same terrain object which is represented by 8 individual flat triangles, defined by 9 points, which may be at vastly different angles to the viewer.

Figure 8A:
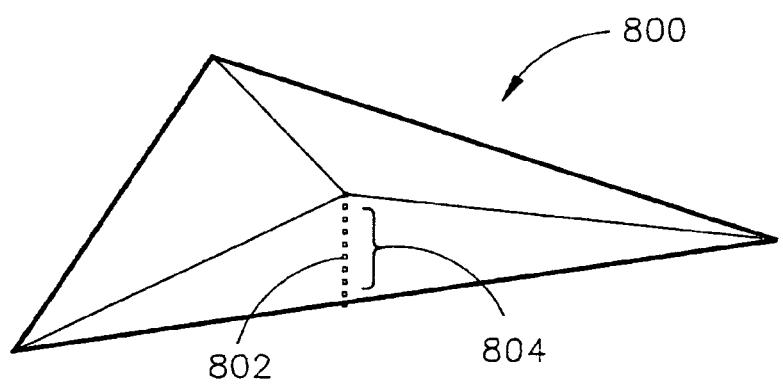
FIG. 8A is a depiction of an error metric algorithm applied on a triangular terrain grid.
Figure 8B:
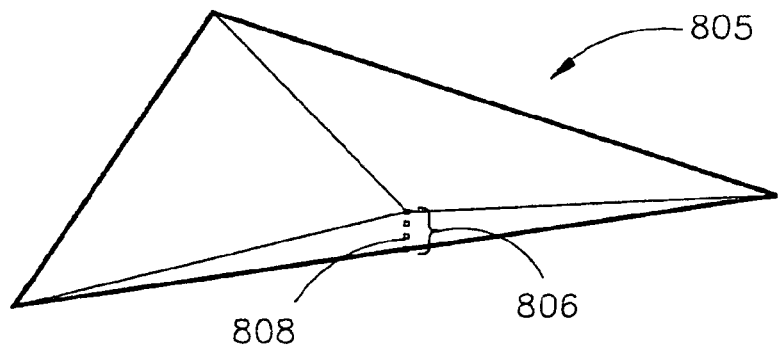
FIG. 8B is a depiction of an error metric algorithm applied on another triangular terrain grid.

It should be appreciated that various error metric calculation methods may be utilized by the present system. In a particular embodiment of the present invention, a viewer based dynamic error metric method may be utilized. Referring now to FIGS. 8A-8B, the view based error metric method is applied to two different terrain triangles 800, 802. First, a terrain triangle 800 is compared with the same area of a finer level of detail triangles. For example, the terrain triangle 800 may be a level-0 terrain triangle in a triangle binary tree. The terrain triangle 800 is compared with level-1 terrain triangles in the triangle binary tree. The difference between the two representations is a delta 802. In FIG. 8A, the delta 802 exceeds the threshold 804 (the visual error is greater than the error bound). The system should draw the finer level of detail in the terrain area represented by the terrain triangle 800. Accordingly, the terrain triangle 800 will be divided into the next level. Referring now to FIG. 8B, a terrain triangle 805 is compared with the same area of a finer level of detail triangles. For example, the triangular terrain segment 805 may be a level-1 terrain segment in a tree. The triangular terrain segment 805 is compared with level-2 terrain segments in the tree. The difference between the two representations is a delta 808. In FIG. 8B, the delta 808 does not exceed the threshold 806 (the visual error is smaller than the threshold), the system assumes that the lower resolution (level-1) terrain representation has an approximate error bound smaller than the threshold. In this manner, such comparison would be performed at each level to reach the appropriate level of detail based on the visual error threshold.

It should be appreciated that the error metric described above may not represent geometric errors of the database to the real world, such as inaccuracies in data collection induce. Instead, the error metric that the present invention utilizes may represent the error between the current, larger triangle and the next level of triangles in the triangle binary three. (Additional vertex may be added to the drawn scene to make it closer to the full mesh.) The algorithm ends after checking a certain level of detail (smaller triangles with vertices at 30 to 100 feet apart, down to the base resolution of the grid). Further, the error-metric may be application specific and can be determined by human factor analysis. By performing a breadth-first search on the database, the user can determine an amount of geometry to be displayed with limited bandwidth of data presentation. The user may be allowed to scale the application to different hardware platforms. Accordingly, a high-powered platform with high bandwidth of data presentation may show a great deal of detail while a low powered one with low bandwidth of data presentation may show a less detail representation. However, even with a low-powered platform, the system may provide a safe flight display with an anticipated, selected and graceful (all portions of the screen would be given an equal quality representation) degradation in performance.

Figure 9A:
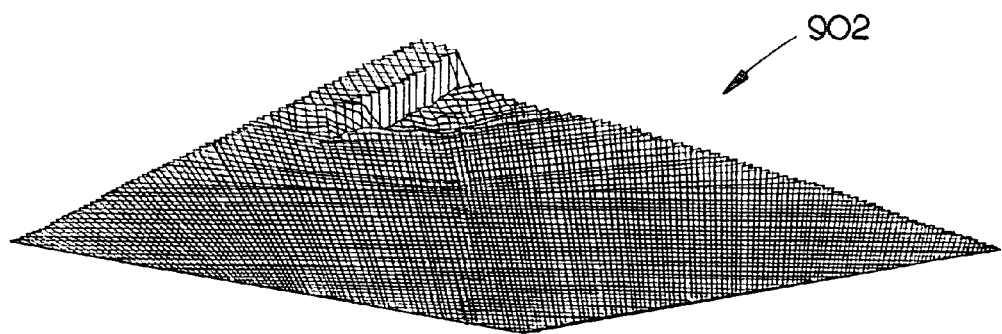
FIGS. 9A-B are illustrations of images of a terrain area generated via the exemplary system described in FIG. 6.
Figure 9B:
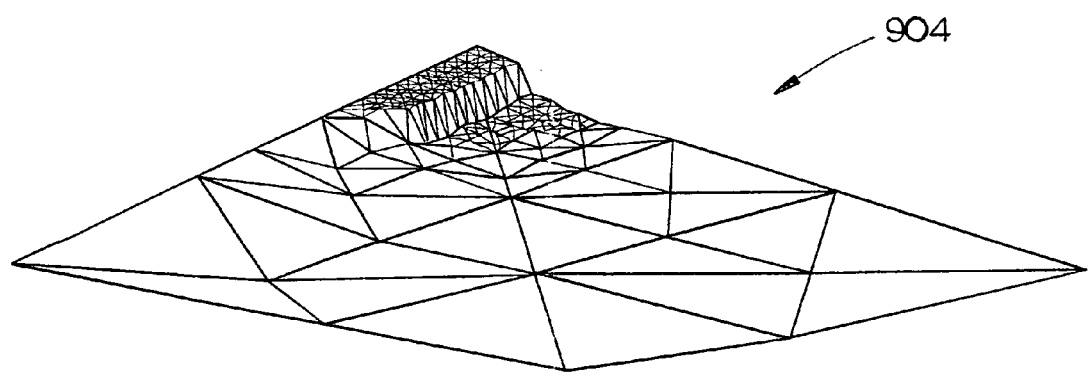

Referring now to FIGS. 9A-B, a Full-Mesh image 902 and a Simple Corner image 904 of a terrain area generated by an exemplary embodiment of the present invention are shown. In FIG. 9A, the Full-Mesh image 902 of the terrain area may require very high-powered platform to be displayed in real time. In FIG. 9B, the Simple Corner image 904 depicts the same terrain area with a reduced resolution and thus require low powered platform.

In exemplary embodiments of the invention, the methods disclosed may be implemented as sets of instructions or software readable by a device. Further, it is understood that the specific order or hierarchy of steps in the methods disclosed are examples of exemplary approaches. Based upon design preferences, it is understood that the specific order or hierarchy of steps in the method can be rearranged while remaining within the scope and spirit of the present invention. The accompanying method claims present elements of the various steps in a sample order, and are not necessarily meant to be limited to the specific order or hierarchy presented.

It is believed that the system and method of the present invention and many of its attendant advantages will be understood by the forgoing description. It is also believed that it will be apparent that various changes may be made in the form, construction and arrangement of the components thereof without departing from the scope and spirit of the invention or without sacrificing all of its material advantages. The form herein before described being merely an explanatory embodiment thereof, it is the intention of the following claims to encompass and include such changes.

What is claimed is:

1. A flight display system for providing a safe depiction of global space data, comprising:
   a sensor system determining a position and orientation of an aircraft;
   a terrain application system generating a plurality of real time terrain images based on said position and orientation of said aircraft provided by said sensor system, said plurality of real time terrain images containing a plurality of polygons having a visual error bound less than a desired error threshold,
   wherein said terrain application system utilizes a view dependent error metric to define and maintain said visual error bound and said terrain application system utilizes a level of detail method and a real time optimally adopting meshes method;
   a terrain database server providing terrain data to said terrain application system upon request of said terrain application system; and
   a display system displaying said plurality of real time terrain images generated by said terrain application system,
   wherein said terrain data is represented by a regular grid terrain mesh.

2. The flight display system described as in claim 1, said terrain database server further comprising:
   a database storing global space data; and
   a processor retrieving terrain data from said database based on said position of said aircraft and providing said retrieved terrain data to said terrain application system.

3. The flight display system described as in claim 2, further comprising:
   an audible flight warning system communicatively coupled to said terrain database server, said audible flight warning system providing a warning upon detection of a hazardous terrain via an audible and visual alarm,
   wherein said terrain database server provides terrain information to said audible flight warning system.

4. The flight display system described in claim 1, wherein said desired error bound is received from a user to define a level of detail in terrain image rendering, wherein said desired error bound is a visual error.

5. The flight display system described in claim 1, wherein each of said plurality of polygons includes a simple isosceles right triangle.

6. A method for providing a safe depiction of global space data on a perspective flight display, comprising the steps of:
   obtaining a position and orientation information of a viewer;
   obtaining terrain data based on said position and orientation information;
   computing a view dependant error metric for said terrain data;
   generating a terrain mesh based on a visual error bound, said terrain mesh having optimized number of triangles,
   wherein said view dependent error metric defines and maintains said visual error bound; and
   displaying a terrain image based on said generated terrain mesh,
   wherein said terrain data is represented as a terrain grid with a height of points of a terrain area and said optimized number of triangles is determined based on a desired visual error bound.

7. The method as described in claim 6, said computing a view dependant error metric step further comprising the steps of:
   a) calculating a delta value by comparing said terrain grid and a next level of detail terrain grid;
   b) comparing said delta value with said desired error threshold value; and
   c) dissecting the terrain grid and producing a plurality of the next level of detail terrain grids if said delta value is greater than said desired error threshold value,
   wherein said delta value is a visual error difference between said terrain grid and said a next level of detail terrain grid.

8. The method as described in claim 7, further comprising:
applying steps a-c) recursively on each of said plurality of the next level of detail terrain grids until said delta value is less than said desired error threshold value.

9. The method as described in claim 6, wherein a level of detail method is utilized.

10. The method as described in claim 6, wherein a real time optimally adopting meshes method is utilized.

11. The method as described in claim 10, wherein a triangle binary tree is utilized to provide a level of detail of said terrain grid represented by a simple isosceles right triangle.

12. The method as descried in claim 10, wherein a plurality of leaf nodes of said triangle binary tree are displayed to represent said terrain data.

13. The method as described in claim 6, further comprising:
receiving a scale of geometry of said terrain image based on bandwidth of data presentation of a display system, wherein the user selects said scale of geometry by inputting said desired error threshold.

14. A flight display system for providing a safe terrain depiction, comprising:
a plurality of sensor systems determining a position and orientation of an aircraft;
a terrain application system generating a plurality of real time terrain images based on said position and orientation of said aircraft provided by said sensor system, said plurality of real time terrain images being generated by utilization of a view dependent error metric to define and maintain a visual error bound and said visual error bound is less than a desired error threshold, wherein the desired error threshold is selectable by the user;
a terrain database server providing terrain data to said terrain application system upon request of said terrain application system, said terrain database server comprising
a database storing global space data; and
a processor retrieving terrain data from said database based on said position of said aircraft and providing said retrieved terrain data to said terrain application system,
wherein said terrain data is represented by a grid terrain mesh; and
a display system displaying said plurality of real time terrain images generated by said terrain application system.

15. The flight display system described in claim 14, wherein said terrain application system utilizes a real time optimally adopting meshes method to generate said terrain mesh based on said view dependent error metric.

16. The flight display system described in claim 1, wherein the base unit for visual error is a pixel.

17. The method as described in claim 6, wherein the base unit for visual error is a pixel.

18. The flight display system described in claim 14, wherein the base unit for visual error is a pixel.

19. The flight display system described in claim 1, wherein the view dependent error metric is determined by the user.

20. The method as described in claim 6, wherein the desired visual error bound is selectable by the user.

* * * * *